(12) United States Patent
Yamamoto et al.

(10) Patent No.: US 7,942,947 B2
(45) Date of Patent: May 17, 2011

(54) DUST FILTER

(75) Inventors: Norihasa Yamamoto, Obu (JP); Takashi Kato, Obu (JP); Masahiro Sugiura, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 233 days.

(21) Appl. No.: 11/856,872

(22) Filed: Sep. 18, 2007

(65) Prior Publication Data

US 2008/0072552 A1    Mar. 27, 2008

(30) Foreign Application Priority Data

Sep. 26, 2006    (JP) ................. 2006-260114
Feb. 21, 2007    (JP) ................. 2007-040413
Feb. 21, 2007    (JP) ................. 2007-040414

(51) Int. Cl.
*B01D 46/00*    (2006.01)
*F02M 35/024*    (2006.01)

(52) U.S. Cl. ............. 55/385.3; 55/497; 55/500; 55/502; 55/521; 55/529; 123/198 E

(58) Field of Classification Search ............ 55/497–511, 55/521, 385.3, 529; 123/198 E
See application file for complete search history.

(56) References Cited

U.S. PATENT DOCUMENTS

| | | | | |
|---|---|---|---|---|
| 4,236,901 A * | 12/1980 | Kato et al. | ...................... | 96/380 |
| 5,597,645 A * | 1/1997 | Pike et al. | .......................... | 96/99 |
| 5,679,122 A * | 10/1997 | Moll et al. | ...................... | 55/497 |
| 5,792,229 A * | 8/1998 | Sassa et al. | ...................... | 55/497 |
| 5,968,215 A * | 10/1999 | Webb | ........................... | 55/385.3 |
| 6,200,368 B1 * | 3/2001 | Guerin et al. | .................... | 96/135 |
| 6,228,152 B1 * | 5/2001 | Guerin et al. | .................... | 96/135 |
| 6,422,197 B1 * | 7/2002 | Amann et al. | ............. | 123/198 E |
| 6,579,337 B2 * | 6/2003 | Heilmann et al. | ................ | 55/495 |
| 6,695,895 B2 * | 2/2004 | Hyodo et al. | ................ | 96/111 |
| 6,837,224 B2 * | 1/2005 | Kidokoro et al. | ............. | 123/520 |
| 7,041,146 B2 * | 5/2006 | Bugli et al. | ...................... | 55/481 |

FOREIGN PATENT DOCUMENTS

| | | |
|---|---|---|
| JP | 2001132563 | 5/2001 |
| JP | 2003239813 | 8/2003 |
| JP | 2004060584 | 2/2004 |
| JP | 2006028873 | 2/2006 |

\* cited by examiner

*Primary Examiner* — Robert A Clemente
(74) *Attorney, Agent, or Firm* — Dennison, Schultz & MacDonald

(57) ABSTRACT

A dust filter of an evaporated fuel treatment device is taught that preferably include a filtration member for filtering air introduced to an atmosphere introduction path, and a casing receiving the filtration member therein. The dust filter being disposed on the atmosphere introduction path of the evaporated fuel treatment device. The filtration member has an arcuate shape in cross section, and wherein the filtration member is arranged and structured such that air flows in a radial direction thereof, so as to be filtered.

2 Claims, 3 Drawing Sheets

_US 7,942,947 B2_

DUST FILTER

TECHNICAL FIELD

The present invention relates to a dust filter of an evaporated fuel treatment device for vehicles.

BACKGROUND ART

Conventionally, in an evaporated fuel treatment device, a dust filter is used for preventing an adsorbent in a canister from clogging by dust. The dust filter of this type is, for example, disclosed in Japanese Laid-Open Patent Publication No. 2003-252071.

The dust filter has a filtration member having a cylindrical shape. The filtration member is arranged so as to surround an inlet pipe. A dust filter in an embodiment is arranged and structured such that air flows through the filtration member in an axial direction thereof. Further, a dust filter in a modified form is arranged and structured such that air is introduced into the filtration member from an outer circumferential side in a radial direction and flows downwardly in an axial direction. Further, a dust filter in another modified form is arranged and structured such that air is introduced into a filtration member from an upper end side in an axial direction thereof and flows inwardly along a radial direction.

However, the above-mentioned dust filter may sometimes have an insufficient filtration effect. Further, the above-mentioned dust filter may generally be easily clogged.

Further, an another dust filter is disclosed in Japanese Laid-Open Patent Publication No. 02-70967. The dust filter has a plate-shaped filtration member, and the filtration member is arranged so as to close a path of a canister. In the dust filter thus constructed, air flows in a thickness direction of the plate-shaped filtration member.

However, the dust filter can be easily clogged. This may lead to increased air-flow resistance.

It is, therefore, an object of the present invention to improve a conventional dust filter.

BRIEF SUMMARY OF THE INVENTION

In an embodiment of the present invention, a dust filter of an evaporated fuel treatment device may include a filtration member for filtering air introduced to an atmosphere introduction path, and a casing receiving the filtration member therein. The dust filter being disposed on the atmosphere introduction path of the evaporated fuel treatment device. The filtration member has an arcuate shape in cross section, and wherein the filtration member is arranged and structured such that air flows in a radial direction thereof, so as to be filtered.

According to the dust filter, air flowing through the atmosphere introduction line is filtered by passing through the filtration member, so that the dust contained in the air is collected by the filtration member.

Also, the filtration member has an arcuate shape in cross section. Therefore, a filtration area of the filtration member can be increased and decreased by simply increasing and decreasing an axial size of the filtration member without changing a radial size (i.e., an outer diameter and/or an inner diameter) thereof.

Further, air flows in the radial direction of the filtration member. Accordingly, the dust collected on the atmosphere introduction side of the filtration member can be easily removed by using backflow of air. Therefore, the dust filter cannot be easily clogged.

Further, in another embodiment of the present invention, a dust filter may include a filtration member for filtering air, a casing receiving the filtration member, a dust trap chamber communicating with an atmosphere introduction space portion, so as to receive dust removed from the filtration member, and a backflow prevention device preventing backflow of the dust from the dust trap chamber to the atmosphere introduction space portion.

According to the dust filter, the backflow of the dust received in the dust trap chamber via the atmosphere introduction space portion is prevented by the backflow prevention wall. Therefore, the dust removed from the filtration member can be effectively prevented from depositing in the atmosphere introduction space portion. As a result, the air-flow resistance of the filtration member 44 can be effectively prevented from rising.

Other objects, features, and advantages, of the present invention will be readily understood after reading the following detailed description together with the accompanying drawings and the claims.

DETAILED DESCRIPTION OF THE INVENTION

Representative embodiments of the present invention will now be described with reference to the drawings.

First Embodiment

First, a first embodiment of the present invention will be described with reference to FIGS. 1 to 3.

Figure 1:
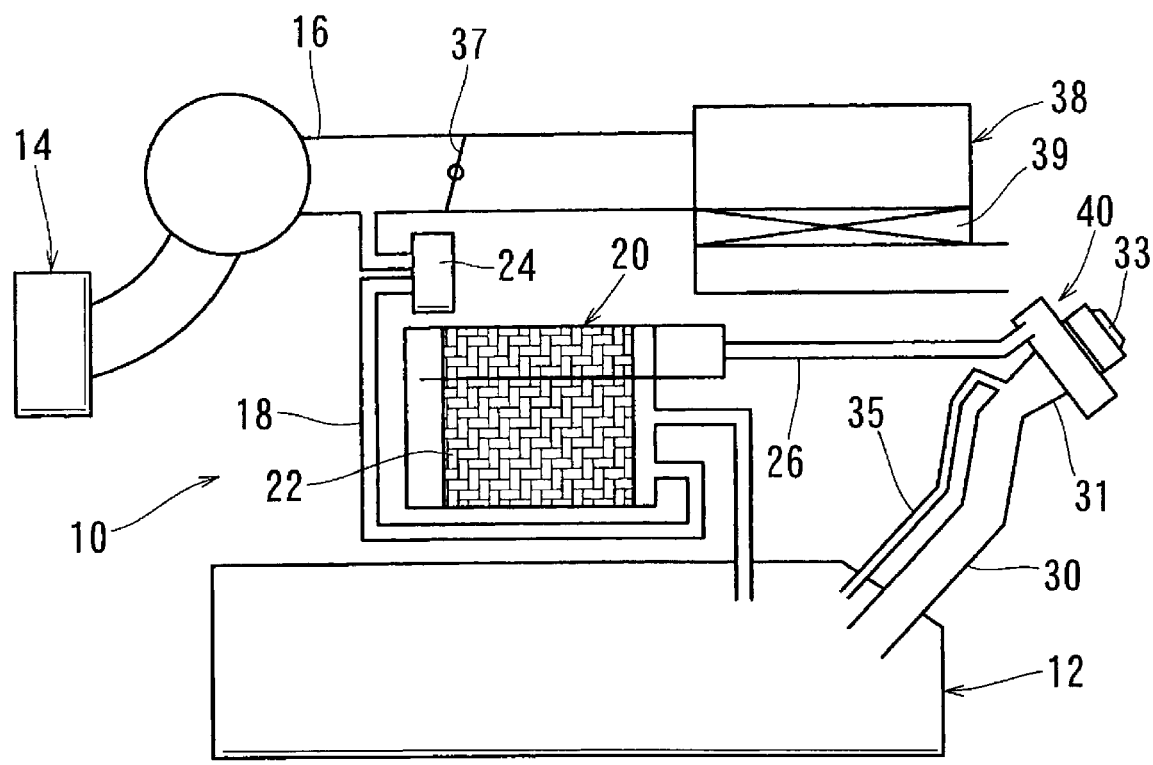
FIG. 1 is a schematic view of an evaporated fuel treatment device in which a dust filter according to a first embodiment of the present invention is used.

As shown in FIG. 1, in an evaporated fuel treatment device 10, an evaporated fuel is adsorbed by an adsorbent 22 in a canister 20 disposed in a middle of a purge line 18 that communicates between a fuel tank 12 and an inlet pipe 16 of an engine 14 (an internal combustion engine). Based on a driving state of the engine 14, a purge valve 24 disposed in the purge line 18 is opened and closed. As a result, the evaporated fuel adsorbed by the adsorbent 22 in the canister 20 is introduced into the inlet pipe 16 through the purge line 18.

The fuel tank 12 is provided with an inlet pipe 30 having a fill opening 31. The inlet pipe 30 is a pipe for introducing a fuel through the fill opening 31 into the fuel tank 12. The fill opening 31 is opened obliquely upwardly. A cap 33 is detachably attached to the fill opening 31. Further, the inlet pipe 30 and the fuel tank 12 are communicated with each other via a breather line 35.

In the canister 20, the evaporated fuel generated in the fuel tank 12 is adsorbed by the adsorbent 22 made of activated carbon or the like, so as to be from being released to an atmosphere through an atmosphere introduction line 26. The evaporated fuel adsorbed by the canister 20 is introduced into the inlet pipe 16 through the purge line 18 with the aid of a negative pressure in the inlet pipe 16 when the purge valve 24 is in an open state, so as to be burned in the engine 14. At this time, air is introduced into the inlet pipe 16 through the atmosphere introduction line 26. Further, the atmosphere introduction line 26 introduces air from the atmosphere into the fuel tank 12 or discharges air from the fuel tank 12 to the atmosphere, so that pressure fluctuation produced in the fuel tank 12 can be reduced. Further, the pressure fluctuation produced in the fuel tank 12 may involve a negative pressure that is caused by fuel consumption, temperature reduction, purging or the like, and a positive pressure that is caused by the evaporated fuel due to temperature rise, fuel vibration or the like. Further, in FIG. 1, reference numerals 37, 38 and 39 respectively correspond to a throttle valve, an air cleaner and an air cleaner element.

Further, a dust filter 40 is attached to the fill opening 31 of the inlet pipe 30. The dust filter 40 has a shape that surrounds at least a part of a circumference of the fill opening 31. The dust filter 40 of this embodiment communicates with an atmosphere side end portion of the atmosphere introduction line 26, which end portion is positioned at a circumferential portion of the fill opening 31 of the inlet pipe 30. The dust filter 40 may filter air introduced into the atmosphere introduction line 26, thereby removing dust contained therein. Further, directions (forward, rearward, leftward and rightward) shown in the drawings should not be construed restrictively.

Figure 2:
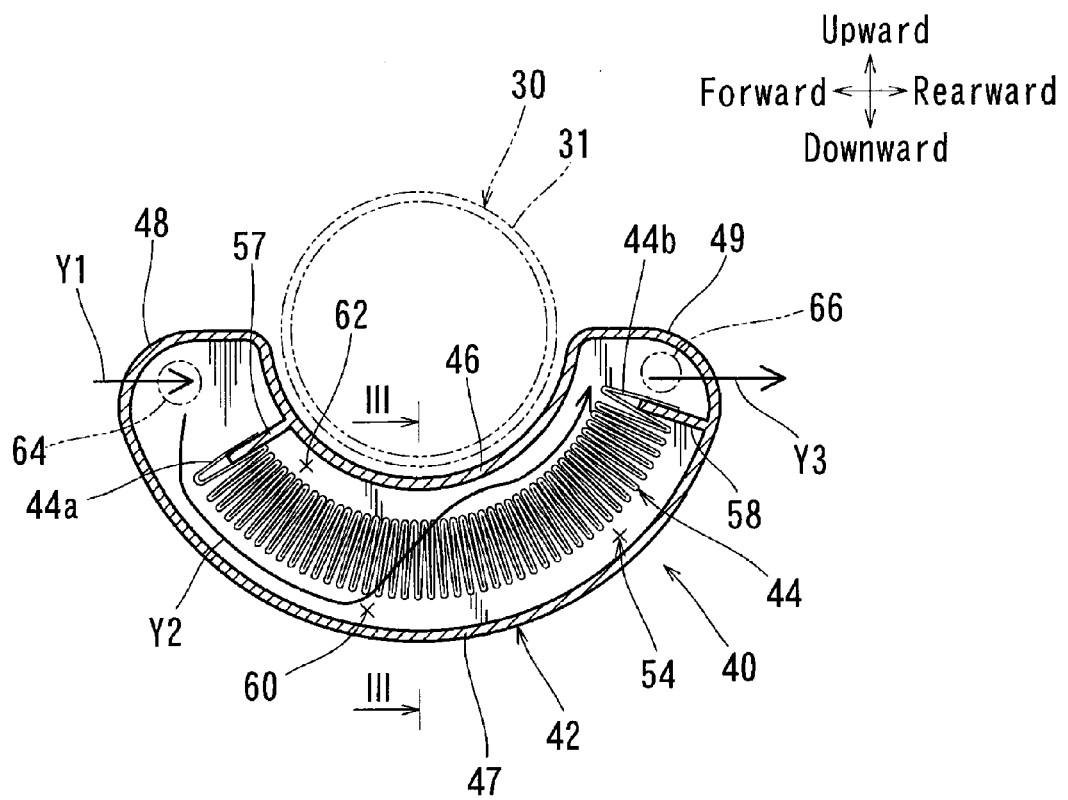
FIG. 2 is a sectional view of the dust filter.
Figure 3:
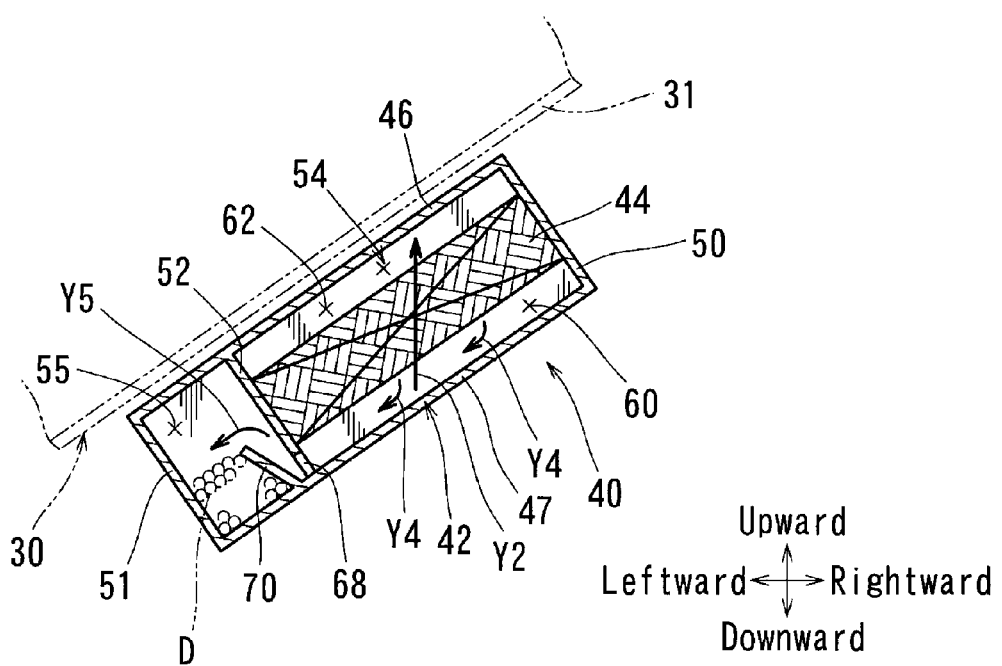
FIG. 3 is a sectional view taken along the line III-III of FIG. 2.

As shown in FIGS. 2 and 3, the dust filter 40 may include a casing 42 and a filtering member 44.

The casing 42 is made of, for example, a resin, and has a semicylindrical shape that can surround a lower half of the fill opening 31 of the inlet pipe 30 (see FIG. 1). The casing 42 may have a semicylindrical inner recessed portion which is coupled to the fill opening 31. The casing 42 includes an inner circumferential wall portion 46 having a semicircular shape in cross section, an outer circumferential wall portion 47 having a semicircular shape in cross section, circumferential end wall portions 48 and 49 (see FIG. 2) connecting circumferential end portions of the inner circumferential wall portion 46 and the outer circumferential wall portion 47, and upper and lower end plate portions 50 and 51 (see FIG. 3) having an arcuate shape and connecting axial end portions (end portions in a depth direction of a plane of FIG. 2) of the inner and outer circumferential wall portions 46 and 47 and the circumferential end wall portions 48 and 49. Further, the outer circumferential wall portion 47 is positioned in parallel to the inner circumferential wall portion 46 at a predetermined interval therefrom. The casing 42 thus constructed may have a sealed inner space having the semicylindrical shape.

As shown in FIG. 3, the casing 42 has a partition wall portion 52 positioned in parallel to the lower end plate portion 51 at a predetermined interval, so that the inner space thereof is divided to an upper filtration chamber 54 and a lower dust trap chamber 55. Thus, the casing 42 has a structure in which a plurality of (two in this embodiment) divided bodies are joined to each other. That is, the casing 42 is structured by arranging a filtration member 44 in the filtration chamber 54 (one of the divided bodies) and joining the divided bodies to each other. Further, the casing 42 is fixed to the fill opening 31 of the inlet pipe 30 by using appropriate fasteners such as screws and clips (not shown). Further, since the fill opening 31 is generally opened obliquely upwardly, the casing 42 is also positioned so as to be inclined along the fill opening 31 (see FIG. 3). Therefore, when the dust filter 40 is assembled to a vehicle, as shown in FIG. 3, the filtration chamber 54 is upwardly positioned and the dust trap chamber 55 is downwardly positioned. Further, the filtration member 44 (which will be described hereinafter) is positioned such that an inner circumferential side (an upper side in FIGS. 2 and 3) thereof is directed upwardly and that an outer circumferential side (a lower side in FIGS. 2 and 3) thereof is directed downwardly.

As shown in FIG. 2, a first support piece 57 is formed in the inner circumferential wall portion 46 at one end side (a left end side in FIG. 2) in a circumferential direction thereof. The first support piece 57 projects outwardly in a radial direction and extending in an axial direction. A distal end portion of the first support piece 57 extends to a middle portion in the radial direction of the filtration chamber 54. Conversely, a second support piece 58 is formed in the outer circumferential wall portion 47 at one end side (a right end side in FIG. 2) in a circumferential direction thereof. The second support piece 58 projects inwardly in the radial direction and extending in an axial direction. A distal end portion of the second support piece 58 extends to a middle portion in the radial direction of the filtration chamber 54.

The filtration member 44 is formed by bending filtration materials in a pleat-shaped manner. Examples of the filtration materials may include filtration paper, non-woven fabric and air-permeable foamed urethane. The filtration member 44 is received in the filtration chamber 54. One end portion (a left end portion in FIG. 2) 44a in the circumferential direction of the filtration member 44 is coupled or connected to the first support piece 57. Further, the other end portion (a right end portion in FIG. 2) 44b in the circumferential direction of the filtration member 44 is coupled or connected to the second support piece 58. Further, an upper edge portion of the filtration member 44 is connected to the upper end plate portion 50, and a lower edge portion of the filtration member 44 is connected to the partition wall portion 52 (see FIG. 3). As a result, the filtration chamber 54 is divided into two space portions by the filtration member 44. One of the two space portions is positioned adjacent to the outer circumferential side (an atmosphere introduction side) of the filtration member 44. The space portion thus positioned is referred to as an atmosphere introduction space portion 60 (see FIGS. 2 and 3). Conversely, the other of the two space portions is positioned adjacent to the inner circumferential side (an atmosphere emission side) of the filtration member 44. The space portion thus positioned is referred to as an atmosphere emission space portion 62 (see FIGS. 2 and 3).

An atmosphere releasing opening 64 is formed in the casing 42 (see FIG. 2). The atmosphere releasing opening 64 is communicated with the atmosphere introduction space portion 60, so as to open the atmosphere introduction space portion 60 to an atmosphere. With this structure, air in the atmosphere can be introduced into the atmosphere introduction space portion 60 of the filtration chamber 54 through the atmosphere releasing opening 64 (see an arrow Y1 in FIG. 2). As will be appreciated, the position of the atmosphere releasing opening 64 is not limited to the position shown FIG. 2.

An air emission opening 66 is formed in the casing 42 (see FIG. 2). The air emission opening 66 is communicated with the atmosphere emission space portion 62, so as to open the atmosphere emission space portion 62 (see FIG. 2). The air emission opening 66 communicates with an atmosphere-side end portion of the atmosphere introduction line 26 (see FIG. 1). With this structure, air in the atmosphere emission space portion 62 of the filtration chamber 54 can be emitted into the atmosphere introduction line 26 (see FIG. 1) through the air emission opening 66, and then be introduced to the canister 20. As will be appreciated, the position of the air emission opening 64 is not limited to the position shown FIG. 2.

As shown in FIG. 3, the partition wall portion 52 of the casing 42 is formed with a communication opening (a dust trap chamber inlet port) 68 that communicate between the atmosphere introduction space portion 60 of the filtration chamber 54 and the dust trap chamber 55. The communication opening 68 is positioned so as to be adjacent to an inner circumferential surface of the outer circumferential wall portion 47. Further, the communication opening 68 is formed in at least the vicinity of a lowest portion in a circumferential direction of the outer circumferential wall portion 47. That is, the communication opening 68 is substantially formed in the lowermost portion of the partition wall portion 52. The communication opening 68 may be formed as a single opening or a plurality of openings. Further, the communication opening 68 may be referred to as "an inlet portion of the dust trap chamber."

A rib-shaped backflow prevention wall (a backflow prevention device) 70 is formed in the outer circumferential wall portion 47, so as to cover the communication opening 68 in a weir-like manner. The backflow prevention wall 70 is positioned adjacent to the lowermost portion of the partition wall portion 52. Further, the backflow prevention wall 70 projects inwardly in the radial direction and extending in the circumferential direction. Further, as shown in FIG. 3, the backflow prevention wall 70 has a height greater than the height of the communication opening 68. Also, the backflow prevention wall 70 is inclined relative to the partition wall portion 52, so that a distal end thereof is gradually spaced away from the the partition wall portion 52.

In the dust filter 40, air flows into the atmosphere introduction space portion 60 (see the arrow Y1 in FIG. 2) through the atmosphere releasing opening 64 (see FIG. 2). The air radially flows through the filtration member 44 from the outer circumferential side toward the inner circumferential side, so as to be filtered. The filtered air flows into the atmosphere emission space portion 62 (see an arrow Y2 in FIGS. 2 and 3). Further, the filtered air flows out through the air emission opening 66 (see an arrow Y3 in FIG. 2). The air is introduced into the canister 20 through the atmosphere introduction line 26, as shown in FIG. 1.

Further, dust is collected on an outer circumferential side of the filtration member 44 facing the atmosphere introduction space portion 60. When the dust filter 40 is assembled to the vehicle, the outer circumferential side of the filtration member 44 is directed downwardly. Accordingly, the dust collected on the outer circumferential side of the filtration member 44 may preferably be removed therefrom due to a gravity, vehicle vibration, a positive pressure at a time of feeding oil or the like and falls on an inner circumferential surface of the outer circumferential wall portion 47 (see arrows Y4 in FIG. 3). Further, the dust are introduced into the dust trap chamber 55 via the communication opening 68 and are received therein (see an arrow Y5 in FIG. 3). At this time, the dust is introduced into a lower space portion of the dust trap chamber 55 beyond the backflow prevention wall 70. Therefore, backflow of the received dust (dust D) can be effectively prevented or reduced by the backflow prevention wall 70.

Further, the dust filter 40 is positioned on an atmosphere introduction path of the canister 20 (the atmosphere-side end portion of the atmosphere introduction line 26 in this embodiment) (see FIG. 1). Therefore, the dust is collected by the filtration member 44 (see FIGS. 2 and 3) when a negative pressure is produced in the canister 20. Also, when a positive pressure is produced in the canister 20, the dust is removed from the filtration member 44 by the pressure (see arrows Y4 in FIG. 3). Therefore, collection of the dust by the filtration member 44 and removal of the dust from the filtration member 44 can be effectively performed. Further, "the atmosphere introduction path" may include an air flow path in the dust filter 40 and the atmosphere introduction line 26.

According to the dust filter 40 of the evaporated fuel treatment device 10, air flowing through the atmosphere introduction line 26 is filtered by passing through the filtration member 44, so that the dust contained in the air is collected by the filtration member 44.

Also, the filtration member 44 has an arcuate shape in cross section. Therefore, unlike the conventional dust filter shown in, for example, Japanese Laid-Open Patent Publication No. 2003-252071, a filtration area of the filtration member 44 can be increased and decreased by simply increasing and decreasing an axial size of the filtration member 44 without changing a radial size (i.e., an outer diameter and/or an inner diameter) thereof.

Further, in this embodiment, air flows in the radial direction of the filtration member 44. Accordingly, the dust collected on one circumferential side (the atmosphere introduction side) of the filtration member 44 can be easily removed by using backflow of air. Therefore, compared with the conventional dust filter, a removal effect of the dust by the backflow of air can be increased.

The casing 42 may surround the lower half of the fill opening 31 of the inlet pipe 30 of the fuel tank 12 (see FIGS. 2 and 3). Therefore, the casing 42 can cushion the fill opening 31 of the inlet pipe 30 at a time of vehicle collision. Further, the casing 42 can be modified to have cylindrical shape, so as to substantially circumferentially surround the fill opening 31 of the inlet pipe 30. The casing 42 thus modified may further effectively protect the fill opening 31 of the inlet pipe 30 at the time of vehicle collision. Further, the casing 42 may be modified so as to have, for example, a C-shape, a rectangular cylindrical shape, a D-shape or other such shapes.

Further, in this embodiment, when the dust filter 40 is assembled to the vehicle, the atmosphere introduction side of the filtration member 44 corresponds to the outer circumferential side of the filtration member 44 that is directed downwardly. Accordingly, the dust is collected on the outer circumferential side of the filtration member 44. The collected dust may preferably be removed therefrom due to a gravity, vehicle vibration, a positive pressure at a time of feeding oil or the like. Therefore, air-flow resistance of the filtration member 44 can be effectively prevented from rising.

In this embodiment, the filtration member 44 has the arcuate shape in cross section, so that the air can radially flows from the outer circumferential side of the filtration member 44 toward the inner circumferential side thereof (see the arrow Y2 in FIGS. 2 and 3). That is, the outer circumferential side of the filtration member 44 having the arcuate shape may function as a dust collecting surface. Therefore, the area of the dust collecting surface of the filtration member 44 may preferably be increased.

Further, the dust removed from the filtration member 44 is received in the dust trap chamber 55 via the atmosphere introduction space portion 60 (see FIG. 3). The backflow of the dust received in the dust trap chamber 55 is prevented or reduced by the backflow prevention wall 70. Therefore, the dust removed from the filtration member 44 can be effectively prevented from depositing in the atmosphere introduction space portion 60. As a result, the air-flow resistance of the filtration member 44 can be effectively prevented from rising.

Further, the backflow prevention wall 70 is a rib-shaped simply-structured member that can cover the communication opening 68 in a weir-like manner. Therefore, the dust filter 40 can be simplified.

Second Embodiment

Figure 4:
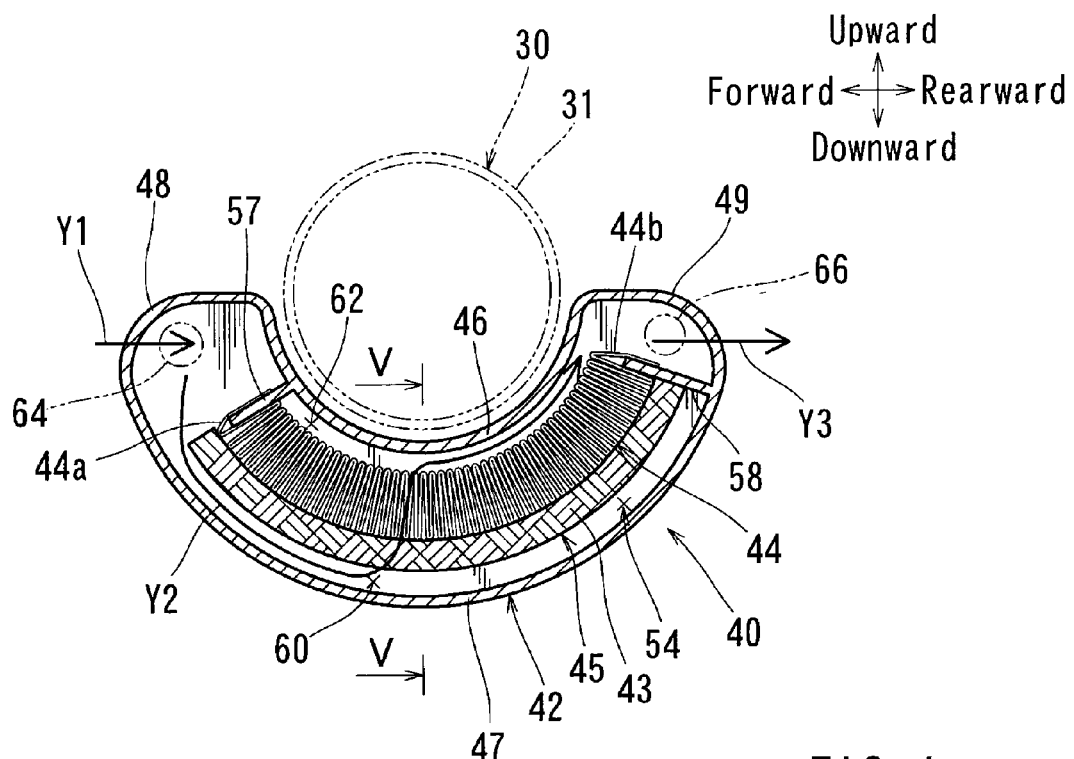
FIG. 4 is a sectional view of the dust filter according to a second embodiment of the present invention.
Figure 5:
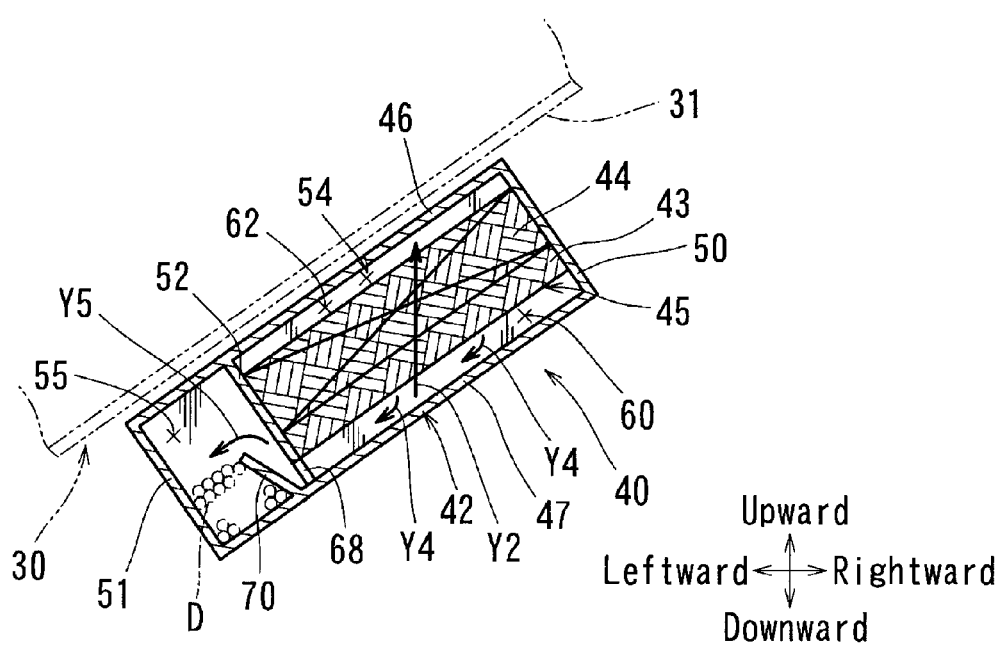
FIG. 5 is a sectional view taken along the line V-V of FIG. 4.

The second detailed representative embodiment will now described with reference to FIGS. 4 and 5.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, an additional filtration member 43 is attached to the outer circumferential side (i.e., the side for collecting the dust) of the filtration member 44 of the dust filter 40. In this embodiment, the filtration members 43 and 44 will be referred to as "a filtration member 45." In addition, the additional filtration member 43 and the filtration membr 44 are respectively referred to as "an upstream filtration portion 43" and "a downstream filtration portion 44."

The upstream filtration portion 43 is made of sheet-shaped filtration materials. Examples of the filtration materials may include filtration paper, non-woven fabric and air-permeable foamed urethane. The upstream filtration portion 43 is laminated on and connected to the outer circumferential side of the downstream filtration portion 44. The downstream filtration portion 44 is a main filtration portion and has a mesh size that can appropriately collect the dust contained in air passing through the casing 42. Conversely, the upstream filtration portion 43 is a subsidiary filtration portion. The upstream filtration portion 43 has a mesh size greater than the mesh size of the downstream filtration portion 44, so as to collect only the dust having a relatively large size contained in the air passing through the casing 42.

In the dust filter 40, the air flowing into the atmosphere introduction space portion 60 (see the arrow Y1 in FIG. 4) radially passes through the upstream filtration portion 43 and the downstream filtration portion 44 from the outer circumferential side toward the inner circumferential side, so as to be filtered. The filtered air flows into the atmosphere emission space portion 62 (see the arrow Y2 in FIG. 4). At this time, the dust having the relatively large size in the air is collected by the upstream filtration portion 43. The remaining dust (i.e., the dust having a relatively small size) in the air is collected by the downstream filtration portion 44.

Further, the dust is collected on an outer circumferential side of the upstream filtration portion 43 facing the atmosphere introduction space portion 60. When the dust filter 40 is assembled to the vehicle, the outer circumferential side of the upstream filtration portion 43 is directed downwardly. Accordingly, the dust collected on the outer circumferential side of the upstream filtration portion 43 may preferably be removed therefrom due to a gravity, vehicle vibration, a positive pressure at a time of feeding oil or the like and falls on the inner circumferential surface of the outer circumferential wall portion 47 (see the arrows Y4 in FIG. 5). Further, the dust are introduced into the dust trap chamber 55 via the communication opening 68 and are received therein (see the arrow Y5 in FIG. 5). At this time, the dust is introduced into the lower space portion of the dust trap chamber 55 beyond the backflow prevention wall 70. Therefore, backflow of the received dust (a dust D) can be effectively prevented or reduced by the backflow prevention wall 70.

The dust filter 40 of the second embodiment may have substantially the same function and effects as the first embodiment.

However, unlike the first embodiment, the filtration portions 43 and 44 of the filtration member 45 respectively have different mesh sizes. That is, the upstream filtration portion 43 has the mesh size greater than the mesh size of the downstream filtration portion 44. In other words, the filtration member 45 has a gradient in mesh size. Therefore, the dust can be separately collected based on the size thereof. As a result, the filtration member 45 may have an improved filtration performance. In addition, the air-flow resistance of the filtration member 45 can be further effectively prevented from rising.

Naturally, various changes and modifications may be made to the present invention without departing from the scope of the invention. For example, the dust filter 40 of the present invention can be applied as a filter of a general air cleaner or the like for filtering air (including other gases). Further, the dust filter 40 of this embodiment can be positioned on any portion on the atmosphere introduction path.

Further, in the second embodiment, the upstream filtration portion 43 and the downstream filtration portion 44 of the filtration member 45 can be made of the different filtration materials or the same filtration material. Further, although the filtration member 45 includes the two filtration portions 43 and 44, the filtration member 45 may include three or more filtration portions that respectively have different mesh sizes. Conversely, the filtration member 45 may includes only a filtration portion in which mesh size thereof is continuously changed from the atmosphere introduction side to the atmosphere emission side. In addition, each of the two filtration portions 43 and 44 may include two or more layered portions. Also, the upstream filtration portion 43 and the downstream filtration portion 44 can be appropriately positioned, so as to be spaced apart from each other.

Further, the backflow prevention wall 70 may be a separately formed member that is movably attached to the outer circumferential wall portion 47, so as to be opened and closed by using an elastic material, a spring material or the like. Further, the backflow prevention wall 70 can be replaced with a check valve such as a flap valve. Further, in the embodiments, although the dust filter 40 is designed such that the outer circumferential side of the filtration member 44 or the filtration member 45 corresponds to the atmosphere introduction side thereof, the dust filter 40 can be modified such that the inner circumferential side of the filtration member 44 or the filtration member 45 corresponds to the atmosphere introduction side thereof, if necessary. Also, the elements such as the casing 42, the filtration members 44 and 45, the dust trap chamber 55 and the backflow prevention wall 70 may have various shapes.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A dust filter of an evaporated fuel treatment device, the dust filter being disposed on an atmosphere introduction path of the evaporated fuel treatment device, comprising:
 a filtration member constructed and arranged for filtering air introduced to the atmosphere introduction path; and
 a casing receiving the filtration member therein,
 wherein the filtration member has an arcuate shape in cross section with an outer circumferential side and an inner circumferential side, and is arranged and structured such that air flows in a radial direction thereof, so as to be filtered, wherein the casing surrounds at least a part of a circumference of a fill opening of an inlet pipe of a fuel tank, wherein the casing has a sealed inner space having a semi-cylindrical shape, wherein the casing has an inner circumferential wall portion having a semicircular shape in cross section, an outer circumferential wall portion having a semicircular shape in cross section, a first support piece that is formed in a circumferential end portion of the inner circumferential wall portion so as to project into the casing inner space, and a second support piece that is formed in a circumferential end portion of the outer circumferential wall portion so as to project into the casing inner space, wherein circumferential end portions of the filtration member are respectively connected to the first and second support pieces, so that an atmosphere introduction space portion and an atmosphere emission space portion that are separated by the filtration member are formed in the inner space of the casing, wherein the filtration member is positioned such that the outer circumferential side is generally downwardly directed, and corresponds to an atmosphere introduction side, and wherein the filtration member is constructed and arranged to collect dust when a negative pressure is present in the evaporated fuel treatment device, and to remove the dust therefrom using backflow of air when a positive pressure is present in the evaporated fuel treatment device.

2. The dust filter as defined in claim 1, wherein the filtration member has a gradient in mesh size, so that an upstream side thereof has a mesh size greater than the mesh size of a downstream side thereof.

* * * * *

UNITED STATES PATENT AND TRADEMARK OFFICE
CERTIFICATE OF CORRECTION

| | | |
|---|---|---|
| PATENT NO. | : 7,942,947 B2 | Page 1 of 1 |
| APPLICATION NO. | : 11/856872 | |
| DATED | : May 17, 2011 | |
| INVENTOR(S) | : Norihisa Yamamoto et al. | |

It is certified that error appears in the above-identified patent and that said Letters Patent is hereby corrected as shown below:

On the Title Page:

Item (75) Inventors: change "Norihasa Yamamoto" to --Norihisa Yamamoto--.

Signed and Sealed this
Second Day of August, 2011

David J. Kappos
*Director of the United States Patent and Trademark Office*